Sept. 10, 1946. R. A. LINCOLN 2,407,561
HOLLOW VALVE FOR INTERNAL-COMBUSTION ENGINE
Filed May 6, 1943
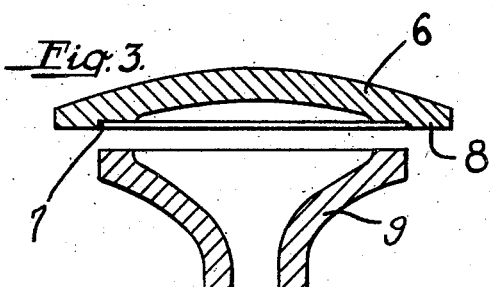
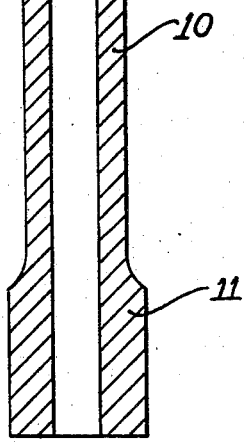
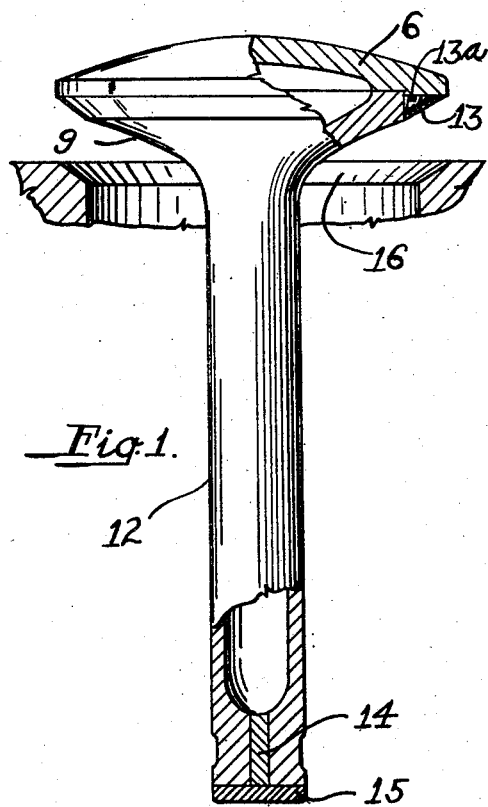
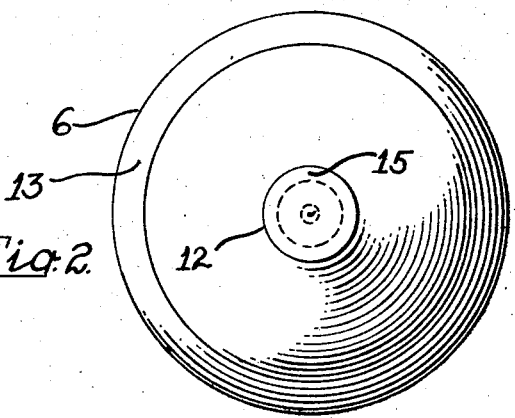
INVENTOR
Rush A. Lincoln
By Green & McCallister
His Attorneys Patented Sept. 10, 1946

2,407,561

UNITED STATES PATENT OFFICE 2,407,561

HOLLOW VALVE FOR INTERNAL-COMBUSTION ENGINES

Rush A. Lincoln, Tarentum, Pa., assignor to Allegheny Ludlum Steel Corporation, a corporation of Pennsylvania Application May 6, 1943, Serial No. 485,817

4 Claims. (Cl. 123—188)

This invention relates generally to valves and particularly to valves such as those employed in modern aeroplane engines and which are subjected to high temperatures and to the flow of hot corrosive gases. Such valves are difficult to produce and are therefore expensive. They are ordinarily so fabricated that they are hollow and contain a cooling medium such as metallic sodium or some equivalent material such as a sodium and mercury amalgam.

The expense involved by the manufacture of these valves is occasioned by the fact that the valves must be made of metals which not only will resist the corrosive and erosive action of hot or burning gases but which will also have sufficient strength, at the temperatures encountered, to resist the strains to which the valves are subjected during use. In addition, the cooling medium employed within such valves has a corrosive effect on the metal of the valve, particularly if the surface of the metal exposed to it is rough or scratched. The corrosive and erosive action of hot gases, to which the exterior of each such valve is subjected during use, is also more pronounced if the external surface of the valve is rough or of such contour as to provide an effective zone or area of attack for such gases. That is to say, both the cooling medium employed and the hot gases have a pitting action which is intensified if the exposed surface of the metal is not smooth and substantially homogeneous.

An object of the present invention is to produce a valve capable of being effectively employed as an exhaust valve for the modern aeroplane engine and which is relatively inexpensive but, at the same time, highly effective in resisting the corrosive and erosive action of hot gases and the strains to which such a valve is subjected under the varying temperatures encountered during operation.

A further object is to produce such a valve in which the separate parts, e. g., the head, the seat and the stem can be readily formed from different metals (alloys), especially selected to perform the different functions of such parts and to cope with the different conditions encountered thereby while the valve is in service.

A further object is to produce a procedure for producing such a valve which is simpler and more economical than the present procedure which generally consists in forming a single piece valve and then processing the different parts thereof by welding, nitriting, etc., to produce surface characteristics which are suitable for the conditions to which such portions of the surface of the valve are subjected during the operation of the valve.

A further object is to produce a new and improved procedure for making an aeroplane engine valve which is not only simple and economical but which also provides a ready and easy means for surfacing the interior of the valve so that it will effectively resist corrosion and the attack of such cooling material as may be employed within the valve.

These and other objects which will be made apparent throughout the further description of my invention, are attained in a valve embodying the features and characteristics herein illustrated and described and also by means of a procedure, such as is herein set forth, for producing such a valve.

In the drawing accompanying and forming a part hereof:

Figure 1 is a side elevation of a valve embodying my invention, shown in association with a fragmental sectional view of a valve seat and with portions of the valve broken away and in section;

Figure 2 is a plan view, from below, of the valve illustrated in Figure 1;

Figure 3 is a transverse sectional view of a metal disk or blank such as is employed in making the crown of a valve embodying my invention; and Figure 4 is a longitudinal sectional view of a blank such as is employed in making the stem and bell portion of a valve embodying my invention.

The procedure now employed in the making of valves for modern internal combustion engines used in aeroplanes, is somewhat intricate and therefore expensive. Each such valve must be of such construction and be formed of such metal that it will not only effectively resist the strains to which it is subjected to at the temperatures of operation, but it must also resist the corrosive and erosive action of the hot or burning exhaust gases. In order to minimize the detrimental effect of the operating conditions encountered, such valves are made hollow and some cooling or heat transferring medium is hermetically sealed within the interior thereof. The cooling medium ordinarily employed is metallic sodium which exists in a molten state at the operating temperatures of the valve. Other materials, however, have been and are employed such, for example, as an amalgam of sodium and mercury which remains in a liquid state throughout the varying temperature conditions encountered by the valve. These cooling materials have a tendency to corrode the metal of the valve and particularly if the surface of such metal, contacted by the cooling material, is rough or scratched so as to provide a point or zone of attack. For this reason it is highly desirable to, in effect, polish the interior of each valve, where cooling material is employed, so as to minimize the corrosive attack of that material on the metal of the valve.

The severe strains to which the valve is subjected during use and the absolute necessity of providing a valve which will resist fracture or appreciable wear during operation, has resulted in the use of expensive alloys in the fabrication of the valves. For example, these aeroplane engine valves are made from such alloys as nichrome and stellite. They are carefully fabricated in order to insure, as far as possible, the elimination of fabrication and temperature strains and, for strength purposes, they are made from a single piece of metal which is ordinarily forged by a rather intricate forging procedure and then machined, ground or otherwise dressed to the final contour.

Forging of a hollow valve is, in itself, a difficult procedure but where the forging is so accomplished as to provide access to the interior of the valve through the open end of the valve stem only, the operation of forging the valve and of then smoothing the interior surface thereof for the purpose of eliminating roughness, scratches, etc., is extremely difficult. It is necessarily an expensive procedure and adds to the cost of the valve.

My invention contemplates the production of an improved valve, such as is here disclosed, and it also contemplates a simplified and improved procedure for producing such a valve. The valve embodying my invention is a multi-part, hollow valve in which the separate parts are combined in a unitary structure so as to form, in effect, a single piece valve but a valve in which each part is formed from metal well adapted to resist the detrimental conditions to which that part is subjected during operation of the valve.

The procedure of my invention consists in providing at least two blanks as the initial step of producing the valve. Each such blank is formed from metal well adapted to resist deterioration, under the conditions encountered by the part of the valve to be made therefrom, during the operation of the valve. I use the term "deterioration" in a broad sense, i. e., to mean a detrimental change, such, for example, as erosion, corrosion, fracture, wear or intergranular change such as may be occasioned by the forces and conditions to which the valve may be subjected during use.

Each blank going into the make-up of the completed valve is so formed that its interior as well as its exterior surface may be machined and/or otherwise dressed to the desired contour and surface characteristics. I, however, prefer to delay the final dressing of the exterior surface of the valve until the separate portions thereof are finally assembled into a unitary structure.

In the illustrated embodiment of my invention, two blanks are employed in the fabrication of the finished valve. The crown of the valve is formed from one such blank and the stem and bell portion of the valve is formed from the other such blank. These blanks are permanently and rigidly secured together to form an integral, or more properly stated, a unitary structure. This joining of the blanks is accomplished prior to the actual completing of the valve. In the illustrated embodiment of my invention, an inlaid weld constitutes the seat-engaging portion of the valve and either forms the connection between the crown and bell portions of the valve or reinforces such a connection and under conditions such that the separate parts of the valve are autogeneously welded together to form a unitary structure.

The blank from which the crown 6 of the valve is formed may be cast from some suitable alloy such as Nichrome, Stellite or ticonium or it may be stamped, pressed, coined or otherwise formed from a plate of such material. By Nichrome I mean a heat resisting metal containing approximately 20% chromium and 80% nickel. By Stellite I mean a heat resisting alloy containing approximately 28% chromium, approximately 65% cobalt, approximately 6% tungsten with the balance principally iron. By ticonium I mean an alloy such as Stellite including about 28% chromium, about 65% of nickel and cobalt in which the nickel and cobalt are present in about equal amounts, about 5% molybdenum, some tungsten and with the balance of the alloy principally iron, i. e., the alloy contains iron and may contain other alloying elements of such nature and in such quantity as not to alter the basic characteristics of the alloy.

As shown in Figures 1 and 3, the crown 6 of the valve is preferably provided with an exterior convex surface. This surface as well as the lower and concave surface of the crown may be and preferably is machined to size and contour and then dressed in such a way as to provide a smooth surface of relatively high polish. The lower or bell-engaging portion of the crown 6 is preferably provided with an annular shoulder 7 which surrounds a centrally disposed shallow recess adapted to receive the end of the bell portion of the valve stem and to center the stem with relation to the crown. As shown in both Figures 1 and 3 the completed crown blank includes a peripheral portion 8 which extends radially beyond the bell portion of the valve stem and consequently beyond the shoulder 7.

The blank from which the valve stem and the bell portion of the valve is formed, may be cast, forged, stamped or pressed and, as shown, the bell and the stem of the valve may be formed in one piece. Here again the metal employed in the make-up of the stem and bell portions of the valve will be selected because of its physical characteristics.

The blank illustrated in Figure 4 is generally tubular, one end being flared so as to form the bell portion 9. The remainder of the blank is shown in the form of a straight walled tube except that the portion 11 thereof remote from the bell 9, is provided with a thickened wall for a substantial part of its length. It will be understood that the substantially straight wall portion 10 and the thickened wall portion 11 constitute the stem 12 of the finished valve.

It will be apparent to those skilled in the art that the blank of Figure 4 may be formed from a thick walled tube and that the bell portion 9 thereof may be swaged or otherwise formed from a cylindrical portion of such a tube. Whether made from a pierced tube or a casting, the important fact is that the blank from which the stem and the bell of the valve is fabricated, is hollow and of such form that its interior surface is readily accessible for the purpose of finishing it to the desired contour, dimensions and surface characteristics. That is to say, the inner as well as the outer surface of the blank may be formed by a machining operation and then dressed to final contour and desired surface condition by polishing or some equivalent procedure. The interior surface as well as the exterior surface of the blank will, however, be so formed as to avoid scratches, roughness and incipient pits.

It will, of course, be apparent that the two blanks of Figures 3 and 4 will eventually be fitted together with the end of the bell portion 9 engaged and surrounded by the shoulder 7 of the crown 6. As disclosed by the drawing the crown is of such size and so positioned on the shank that a lateral face thereof is in engagement with the end of the bell portion of the shank, overhangs or extends radially beyond the peripheral edge of the bell portion throughout the circumferential extent thereof and forms therewith a substantially V-shaped slot or recess which extends around the axis of the shank. Any suitable means may be employed for rigidly and permanently securing these two parts together. As a preliminary procedure, I prefer to secure them together by electric resistance welding, i. e., by a form of welding in which the metal of which each blank is formed, constitutes the welding medium.

The seat-engaging portion 13 of the valve is then formed and is preferably formed by a welding operation which may be employed in initially connecting together the crown 6 and bell portion 9 of the valve or which may merely supplement the welding operation described as a preliminary procedure for securing these two parts together. In either case, the portion 13 of the valve consists of an inlaid weld. It may be a single bead welding operation in which the weld metal employed is Stellite or some equivalent alloy. I, however, prefer to employ a base bead 13a of some metal such as an austenitic stainless steel which is located in the crotch of the slot or recess located between the bell 9 and the crown 6. This base bead 13a is then covered by welding material such as Stellite which fills the recess between the bell 9 and the crown 6 and forms the annular seat-engaging portion 13 of the valve and is in welding engagement with the base bead 13a and with the crown 6 and the bell 9 through circumferential extent of each.

It will, of course, be understood that this seat-engaging portion of the valve may be machined, dressed and surface conditioned as described in connection with other portions of the valve and that the entire exterior surface of the valve will be such as to provide an uninterrupted surface over the entire valve which is substantially devoid of such surface checks, cracks and imperfections as contribute to erosion, corrosion or wear under the conditions encountered by the valve during operation. The seat-engaging portion 13 may, of course, be fitted to the valve seat 16 by a conventional valve grinding operation.

It will be apparent that the sequence of steps, constituting the valve forming procedure, is not particularly important. The seat-engaging portion 13 of the valve may be formed before or after the interior of the valve is partially filled with a cooling medium, and hermetically sealed to permanently enclose that medium within the hollow interior of the valve. The sealing of the valve may be accomplished in the conventional manner, i. e., by forging the thick wall portion 11 of the blank to size while closing the end of the valve stem to hermetically seal the interior thereof.

In Figure 1 I have shown the lower end of the valve stem provided with a plug 14 which, in accordance with usual procedure, is welded in position by the above designated forging operation.

The lower end of the valve is shown tipped by a plate 15 of suitable hard metal for resisting the forces exerted on the valve by the valve-actuating tappet or arm which engages this end of the valve and controls the valve movements.

It will also be apparent to those skilled in the art that the closing of the valve stem end of the valve may be accomplished before the two blanks are fitted and welded together. In other words, the cooling medium employed may be placed in the bell end of the valve stem after the other end thereof is closed and the welding of the crown to the bell will, under such conditions, close and hermetically seal the interior of the valve. In addition, the dressing of the interior surface of the valve to final contour and surface characteristics may include some procedure such as plating or, preferably, anodic polishing wherein the surface to be conditioned is made anode in an electrolytic cell and subjected to an electrolyte such as highly concentrated phosphoric acid.

From the foregoing description, it will be apparent that the bell portion 9 and the stem portion 12 of the valve may be formed from separate blanks each of which is composed of special metal selected because of its particular characteristics. I, however, prefer to form the so-called shank of the valve, i. e., the bell and stem portions, from a single piece of metal and I, therefore, select a ferrous alloy having duplex characteristics, i. e., characteristics such that the portion of the bell of the valve, immediately adjacent to the crown 6, is predominantly austenitic, whereas the stem portion of the valve, i. e., that portion of the valve engaged by the bearings and removed from the heat of the burning gases, is predominantly ferritic. As an example of such an alloy, I note one containing approximately 18% chromium, approximately 4% nickel, approximately 3% molybdenum and approximately 0.15% nitrogen, with the balance principally iron.

Valves fabricated as herein set forth and from the alloys herein defined are highly effective, for the purpose intended, and are simpler and cheaper to produce than such valves now in use and having similar wear and heat resisting characteristics. It will also be noted that the head of the valve, i. e., that portion which is subjected to the heat of combustion, is formed of two parts, viz: the crown 6 and the bell 9. As described the crown may be and preferably is formed of a highly resistant metal whereas the bell may be formed in one piece with the stem and from an alloy having duplex characteristics. Where this is the case, the portion of the valve shank which exists at a high temperature during the operation of the valve is not only capable of resisting corrosion and erosion under the conditions encountered but also exhibits the necessary degree of strength at the high temperatures encountered. The duplex characteristics of the alloy also provide a stem portion for the valve which is predominantly ferritic and exhibits a high degree of hardness and strength at temperatures in the neighborhood of room temperatures, i. e., at temperatures such as are encountered by the stem during the operation of the valve.

From the foregoing it will be apparent that valves embodying my invention and formed in accordance with the procedure here outlined, effectively resist deterioration and are fabricated at a relatively small expense as compared to present day valves having similar deterioration-resisting characteristics. Where the term "conditioning" is employed in the appended claims with reference to a surface or surfaces, it defines a procedure such as mechanical polishing, plating or an anodic polishing for producing a smooth surface of relatively high polish which is substantially free from surface imperfections such as checks, cracks, scratches and incipient pits which promote or contribute to the activity of erosive and corrosive forces, and likewise the term "conditioned" when employed in a claim as defining a surface or surfaces means that the same has been so dressed or conditioned that it is in effect devoid of such surface imperfections.

What I claim is:

1. A hollow valve for internal combustion engines, having its internal and external surfaces conditioned and substantially free from surface imperfections and comprising a circular, disc-shaped crown recessed on one side thereof to form an annular, shank-engaging shoulder spaced from the edge thereof; a hollow shank consisting of a stem portion and a bell portion formed from a single piece of metal with the bell portion projecting into the recess of said crown, engaging the shoulder thereof and forming with said crown a V-shaped notch extending around the bell side of said crown; and an inlaid weld located within said notch, in welding engagement with said crown and the bell portion of said shank, forming a continuation of the peripheral surface of each and constituting the seat engaging portion of said valve.

2. A hollow valve for internal combustion engines and the like comprising a heat resisting, circular, disc-shaped crown having an annular, shank-engaging shoulder formed on one side thereof and spaced from the edge thereof; a hollow shank consisting of a stem portion and a bell portion, formed from a single piece of metal with the stem portion predominantly ferritic and the bell portion predominantly austenitic, engaging the shoulder of said crown and forming with said crown a V-shaped notch extending around the bell side of said crown; and an inlaid weld of heat-resisting metal located within said notch, in welded engagement with said crown and the bell portion of said shank, forming a continuation of the peripheral surface of each and constituting the seat engaging portion of the valve.

3. A hollow valve for internal combustion engines and the like comprising a circular, disc-shaped crown composed of a heat-resisting alloy containing at least 20% chromium and at least 60% of metal from the group including nickel and cobalt; a hollow shank composed of an alloy containing a number of alloying constituents of which the following in the amounts specified are the only constituents essential to produce the desired characteristics; approximately 18% chromium, approximately 4% nickel, approximately 3% molybdenum, approximately 0.15% nitrogen with the balance principally iron and consisting of a stem and bell portion formed from a single piece of such alloy with the stem portion predominantly ferritic and the bell portion predominantly austenitic, engaging said crown and forming therewith a V-shaped notch extending around said bell portion and said crown; and an inlaid weld of heat-resisting metal similar to the metal of said crown, located within said notch in welding engagement with said crown and the bell portion of said shank, forming a continuation of the peripheral surface of each and constituting the seat-engaging portion of the valve.

4. A hollow valve for internal combustion engines and the like comprising a circular, disc-shaped crown composed of heat-resistant metal and having an annular, shank-engaging shoulder formed on one side thereof and extending therearound substantially parallel to the peripheral edge thereof; a hollow shank composed of an alloy containing about 18% chromium, about 4% nickel, about 3% molybdenum and about 0.15% nitrogen with the balance principally iron and consisting of an integrally formed hollow stem and bell portion with the stem predominantly ferritic and the bell portion predominantly austenitic and engaging the shoulder of said crown and forming therewith a V-shaped notch extending around the bell portion and said crown; and, an inlaid weld of heat-resisting metal located within said notch in welding engagement with said crown and the bell portion of said shank and constituting the seat-engaging portion of said valve.

RUSH A. LINCOLN.